R. T. NEWTON.
BUMPER.
APPLICATION FILED FEB. 24, 1919.
1,346,668.
Patented July 13, 1920.
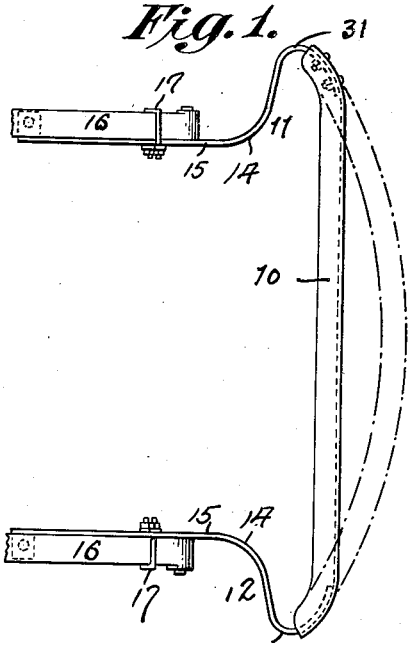
Fig. 1.
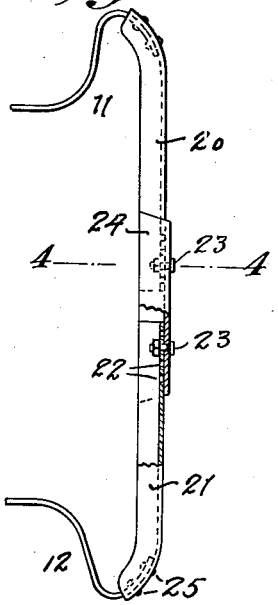
Fig. 3.
Fig. 5.
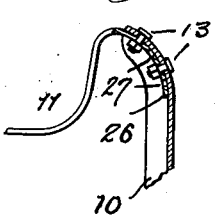
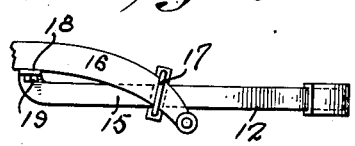
Fig. 2.
Fig. 6.
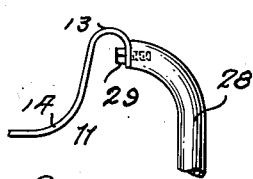
Fig. 4.
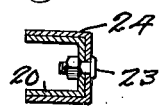
Fig. 7.
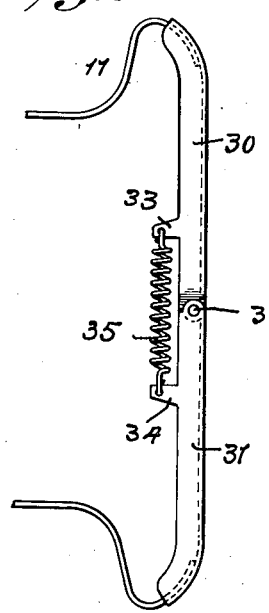
Fig. 8.
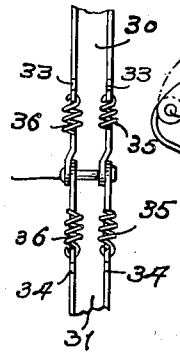
Fig. 9.
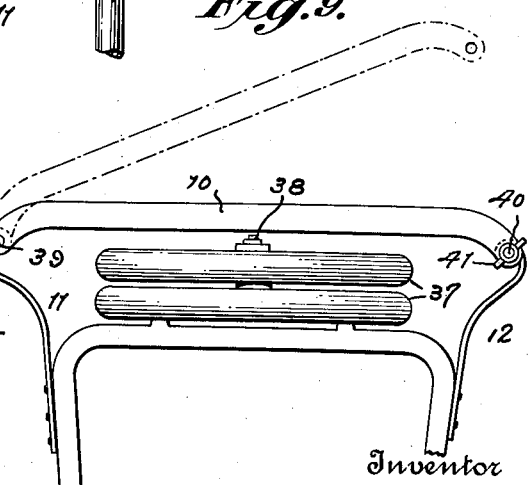
Inventor
RICHARD T. NEWTON
By his Attorneys,

UNITED STATES PATENT OFFICE.

RICHARD T. NEWTON, OF NEW YORK, N. Y.

BUMPER.

1,346,668. Specification of Letters Patent. Patented July 13, 1920.

Application filed February 24, 1919. Serial No. 278,817.

*To all whom it may concern:*

Be it known that I, RICHARD T. NEWTON, a citizen of the United States of America, and residing in the city, county, and State of New York, have invented a certain new and Improved Bumper, of which the following is a specification.

My invention relates to bumpers, and particularly to bumpers for automobiles, the object of my invention being to provide a simple and efficient construction readily manufactured, and easily attached to the chassis of the automobile to which the bumper is applied.

In the accompanying drawings—

Figure 1 is a plan view of a bumper in which my invention is embodied in one form showing it attached to the side members of an automobile chassis;

Fig. 2 is a side elevation of the same;

Fig. 3 is a broken plan of a modified construction;

Fig. 4 is a section on the line 4—4 of Fig. 3;

Fig. 5 is a partial horizontal section of the construction showing a modified adjustable connection between the impact member of the bar and its end support;

Fig. 6 is a broken plan of a further modification;

Fig. 7 is a broken plan of another modification in which the impact bar is centrally divided; and Fig. 8 is a broken rear elevation thereof; and Fig. 9 is a plan of a further modified construction adapted for the rear of the car.

Referring to the construction shown in Figs. 1 and 2, the present bumper comprises an impact member 10 of channel section, which may be either straight, as shown in full lines, or outwardly arched, as shown in dot and dash lines, the opposite ends of the impact member in either event being rearwardly curved. Secured to the curved ends of the impact bar 10 are spring straps 11 and 12, the outer ends of which are curved to the arc of the impact bar ends and lie between the flanges of the bar. It is secured to the bar in any suitable way, by welding, riveting, bolting, or otherwise. I here indicate at the top of Fig. 1 bolts 31, while at the bottom of the figure the joints between the supporting arm 12 and the bar is secured by welding. Each supporting arm 11 and 12 comprises a spring loop 13 curved inwardly toward the center of the bumper and merging by an oppositely curved bend 14 into a straight strap 15 adapted to lie against the chassis side bar terminal horn 16 and be secured thereto in any suitable way, to transmit thereto the stress imposed upon the bumper. I have here indicated the straps secured in position by a yoke 17 embracing the horn 16 and affording an adjustable support for the bumper, the rear end of the strap 15 being offset to form a lug 18 underlying the lower flange of the chassis channel, and being secured thereto by a bolt 19.

While a construction such as that just described is susceptible of slight adjustment to accommodate the bumper, to chassis of different widths by springing the supporting straps 11 and 12, I prefer to maintain the latter at their normal curvature and secure the adjustment by means of an arrangement such as that shown in Figs. 3 and 4. In this case the impact member is subdivided into two portions 20 and 21, perforated at 22 adjacent their juxtaposed ends to receive bolts 23 which pass through a bridge piece 24 serving to unite the bumper sections 20 and 21 and forming the same in a rigid whole. In the form here shown the bridge piece 24 is of channel section and embraces the juxtaposed ends in the channel members 20 and 21. In this figure I have shown the impact member secured to the spring bar end supports 11 and 12 by rivets 25. The supporting members 11 and 12 are of the same type as that first described.

Instead of securing the adjustment of the width of the bumper by subdividing the impact member, I may attain the same end by an adjustable connection between the spring end supports and the impact bar as illustrated in Fig. 5. In this case the outer terminal 26 of the end support is made somewhat longer than in the previous constructions, and is provided with a series of perforations 27 adapted to afford a transversely adjustable connection between the impact bar and its end support.

In any of the constructions heretofore described I may substitute for the channel bar a solid rod such as 28, in Fig. 6, to which the spring end support 11 will be secured by a screw bolt 29 taking into a tap in the recurved end of the bar.

In Figs. 7 and 8 I have illustrated a further modification in which the impact bar comprises a pair of channel sections 30 and 31, one of which has its side flanges offset at the juxtaposed ends of the bar to overlap the corresponding flanges of the other section, both being pierced in register to receive a hinge pin 32. Projecting from the upper and lower flanges of both sections 30 and 31 are lugs 33 and 34, to which are secured the opposite ends of coil springs 35 and 36. These springs are under tension and serve to hold the impact bar sections 30 and 31 normally in alinement, while at the same time permitting a central inward deflection of the impact bar against the action of the springs 35 and 36. This relieves the end straps 11 and 12 from some of the strain to which they are subjected in a head-on collision.

In Fig. 9, I have shown a further modified construction, which is of special utility at the rear of the car. It is common practice to mount at the car back a pair of spare wheels, 37, carried by a central hub 38. In order to remove these from the hub 38 it is necessary to shift them longitudinally of the car, and this necessitates, under ordinary circumstances, the mounting of the rear bumper at a point sufficiently distant from the spare wheels 37 to permit their longitudinal withdrawal from the hub 38. The projection of the bumper at this distance from the chassis imposes a considerable strain upon the supporting members and the attaching brackets, and is apt to cause breakage, or in any event loosening the attaching brackets to such an extent as to cause a rattle. By the present construction I have mounted the impact bar much closer to the wheels than can ordinarily be done and so construct the bumper that its impact member may be readily shifted from position when access to the tire is desired. Thus, at one end the impact member 10 is hinged at 39 to the spring supporting strap 11, while its opposite end is detachably connected to the spring strap 12 by a readily removed bolt 40 provided with a wing nut 41. When a tire is to be removed from the hub 38 it is merely necessary to loosen the wing nut 41, withdraw the bolt 40, and swing out the impact member 10 on the hinge 39 to permit free access to the spare wheels 37.

I am aware that it has been heretofore proposed in Faegol No. 1,175,348 to combine a spring strap end support with a rigid channel impact bar, but in this prior construction the end of the impact bar forms a projecting horn beyond the spring strap end support, which is a source of weakness and danger entirely eliminated by the present construction. It is impossible in the present construction to "hook" the bumper when backing the car since any object engaged by the back of the end straps will slide off, or the bumper will spring away and clear it without damage to either the bumper or the object hooked. When applied to the back of a car this consideration is of the utmost importance during the forward travel of the car.

From the standpoint of manufacture, the present construction is simpler and cheaper to make than that heretofore proposed; the support by the end straps is stiffer; there is less vibration due to the shorter length of the end straps; a heavier blow may be received with less injury, and particularly a blow near the end of the impact bar. The construction suggested in the prior art patent referred to contains no suggestion of the adjustability secured by the modified form of construction of Figs. 3 and 4, or of the types shown in Figs. 6 to 9 inclusive. Various other modifications will readily occur to those skilled in the art which do not depart from what I claim as my invention.

I claim—

1. An automobile bumper comprising a rigid impact member of channel section, and spring strap supports extending slightly beyond and curved inwardly from the opposite ends of the impact member and terminating in supporting arms adapted to be secured to the chassis frame.

2. In an automobile bumper, an impact member of channel section with curved ends, and a spring supporting strap having a curved outer end fitting within said curved end of the channel and secured thereto.

3. In an automobile bumper, an impact bar comprising independent channel sections, a channel section bridge piece embracing the juxtaposed ends of the channel sections, and means for adjustably securing the parts together.

4. In a construction such as specified in claim 1, an impact bar comprising independent channel sections, a channel section bridge piece embracing the juxtaposed ends of the channel sections, and means for adjustably securing the parts together.

5. In an automobile bumper, a rigid impact member, spring supports to which opposite ends of said impact member are attached, the attachment at one end comprising a hinge and that at the other end comprising a quick detachable connection, substantially as described.

In testimony whereof I have signed my name to this specification.

RICHARD T. NEWTON.